United States Patent [19]

Peters

[11] 3,909,902
[45] Oct. 7, 1975

[54] CELL INSERTING MACHINE

[76] Inventor: Robert W. Peters, 9036 N. 75th St., Milwaukee, Wis. 53233

[22] Filed: May 30, 1974

[21] Appl. No.: 474,393

[52] U.S. Cl. ................... 29/205 E; 29/596; 93/1 G
[51] Int. Cl.² ........................................ H02K 15/10
[58] Field of Search .......... 29/205 R, 205 E, 205 D, 29/596, 606; 310/215; 93/1 G

[56] References Cited
UNITED STATES PATENTS

| | | | |
|---|---|---|---|
| 3,514,836 | 6/1970 | Mason | 29/205 E |
| 3,616,512 | 11/1971 | Appenzeller et al. | 29/205 E |
| 3,703,854 | 11/1971 | Schlandroff | 29/205 E |
| 3,727,287 | 4/1973 | Davis | 29/205 E |
| 3,812,570 | 5/1974 | Mason | 29/205 D |

*Primary Examiner*—Carl E. Hall
*Attorney, Agent, or Firm*—Ronald E. Barry

[57] ABSTRACT

An automatic cell cutting, forming and inserting machine including a turret driven in a step-by-step manner to carry stators from a loading station to a cell inserting station to an unloading station, the stators being positively aligned in the turret and indexed at the inserting station in a step-by-step manner in sequence with a cell cutting and inserting apparatus, the cell cutting and inserting apparatus including a material feed assembly for feeding a strip of cell material through a cutting assembly to a cell forming and inserting assembly. An edge cuffer is positioned in the path of motion of the strip of cell material to form a cuff on each edge of the strip of material. The cell forming and inserting assembly includes a cell carrier positioned to receive said strip of cell material, a cell creaser blade operatively positioned to engage said cell carrier to hold and crease the strip of material prior to cutting, and a cell former to wrap the cut strip around the cell carrier to form the cell. The cell is carried on the cell carrier through a plow which has the same shape as the slots in the stator into a slot in the stator. The indent or crease in the cell on release from the cell carrier biasing the cell outwardly to form a snug fit in the slot.

11 Claims, 22 Drawing Figures

CELL INSERTING MACHINE

BACKGROUND OF THE INVENTION

Prior to winding coils on stators for electric motors or generators, an insulating member is inserted into the stator slots. The insulating member is generally of a U-shape and various types of machines have been designed for automatically inserting the U-shaped members into the slots. These machines for the most part mechanically push the member into the slot. If not properly aligned, the insulating member can be skewed in the slot and often times damaged. It has also been found that in order to insert a U-shaped insulting member into the stator slot, the member must have an outer shape smaller than the shape of the slot. This results in the insulating member, if too small, being loose in the slot.

SUMMARY OF THE INVENTION

The cell inserting machine of the present invention provides for the automatic cutting, forming and inserting of insulating cells into the slots of a stator. The cells are carried into the slots on a cell carrier through a guide or plow which aligns and forms the cell to the shape of the slot. Misalignment is prevented by moving the plow into abutting engagement with the stator prior to insertion of the cell into the stator slot.

The cells are seated in the slots with a tight or snug fit. This is accomplished by indenting or creasing the cells prior to insertion so that the indent will flatten out to expand the cell slightly after insertion in the slot to provide the tight fit.

DESCRIPTION OF THE INVENTION

Figure 1:
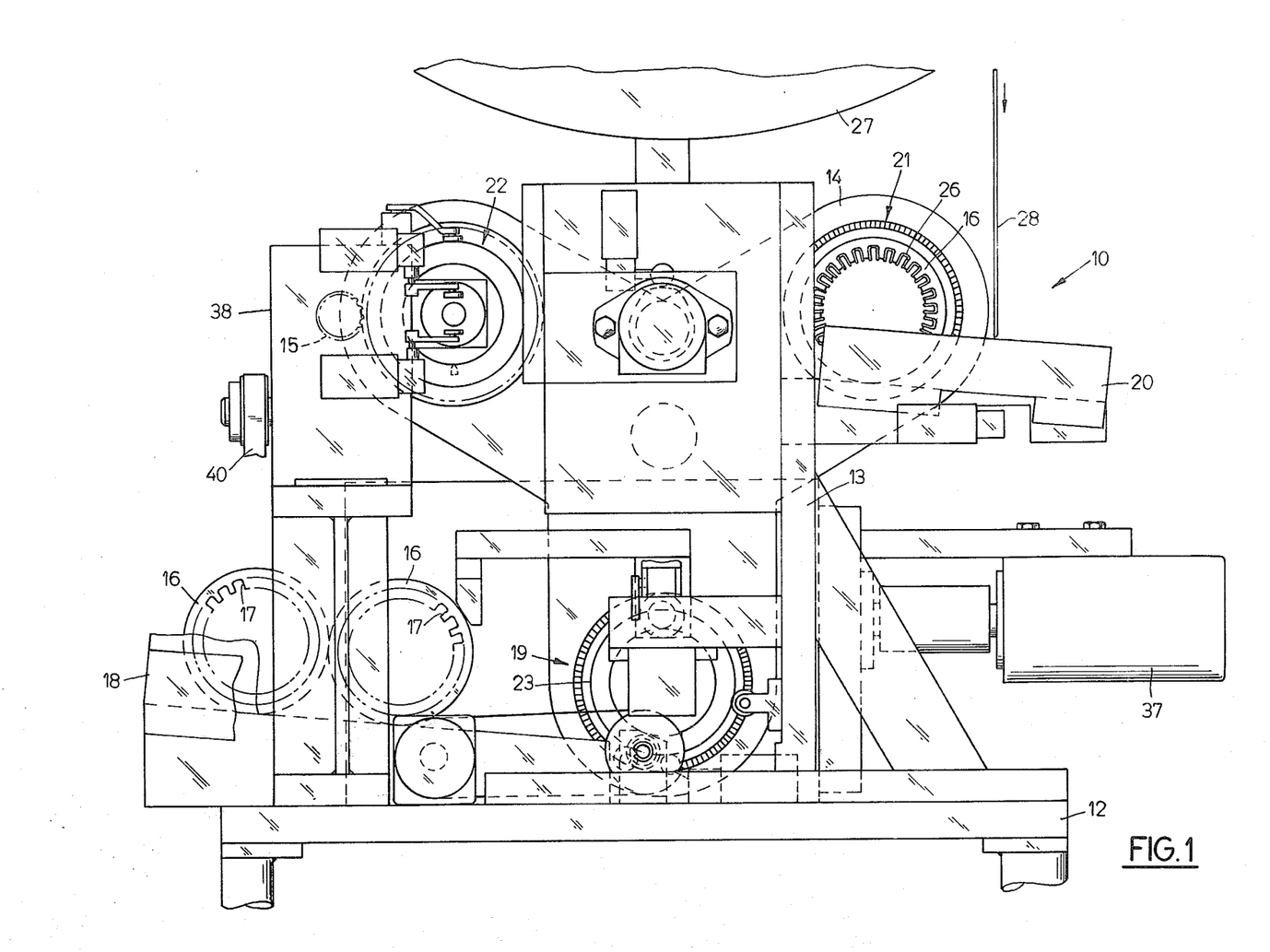
FIG. 1 is a front view of the cell inserting machine of this invention.

The cell inserting machine 10 of this invention (FIGS. 1, 2 and 3) generally includes a base 12 having a number of vertical support plates 13 and a turret 14 mounted for rotary motion on said plates. Stators 16 are loaded into the turret 14 through a loading ramp 18 and are removed from the turret by means of an unloading ramp 20. The loading ramp 18 guides the stators 16 to a turret loading station generally designated at 19. The unloading ramp 20 receives the stators 16 at the turret unloading station generally designated at 21. The turret 14 is rotated in a step-by-step manner to advance the stators 16 from the loading station 19 to a cell inserting station generally designated at 22 and from the cell inserting station 22 to the unloading station 21.

The apparatus used to load and unload the stators 16 into and out of the turret 14 are conventional devices and include means for indexing the stators 16 prior to loading to align the slots 17 in the stators 16 in a predetermined relation in the turret 14. Means are provided for pushing the stators 16 in the form of a plate or disc 23 into the turret 14 and for removing the stators 16 from the turret 14 at the unloading station 21 in the form of a second plate or disc 25. The stators 16 are rotated within the turret 14 at the cell inserting station 22 to align the slots 17 by a step motor driven disc 15. Indexing, loading and unloading of stators into a turret can be done by a number of devices. However, a complete description has not been given here since it does not form a part of the present application.

In accordance with the invention, a cell inserting apparatus 24 is provided at the cell inserting station 22 for automatically inserting cells 26 (FIG. 4) into the slots 17 of the stator 16. The cells 26 are formed from a strip 28 of cell material such as Nomax which is fed in a step-by-step manner from a roll 27 by means of a material feed assembly 30 (FIGS. 5 and 6) to the inserting station 22. The strip 28 of material is cut by means of a cutting assembly 32 (FIGS. 11, 12 and 13) to a body portion 25 of predetermined length and then formed and inserted by a cell inserting assembly 35 (FIGS. 14–18) into a slot 17 in the stators 16. The stator 16 is indexed in a known manner to properly align the slots 17 at the inserting station.

Figure 2:
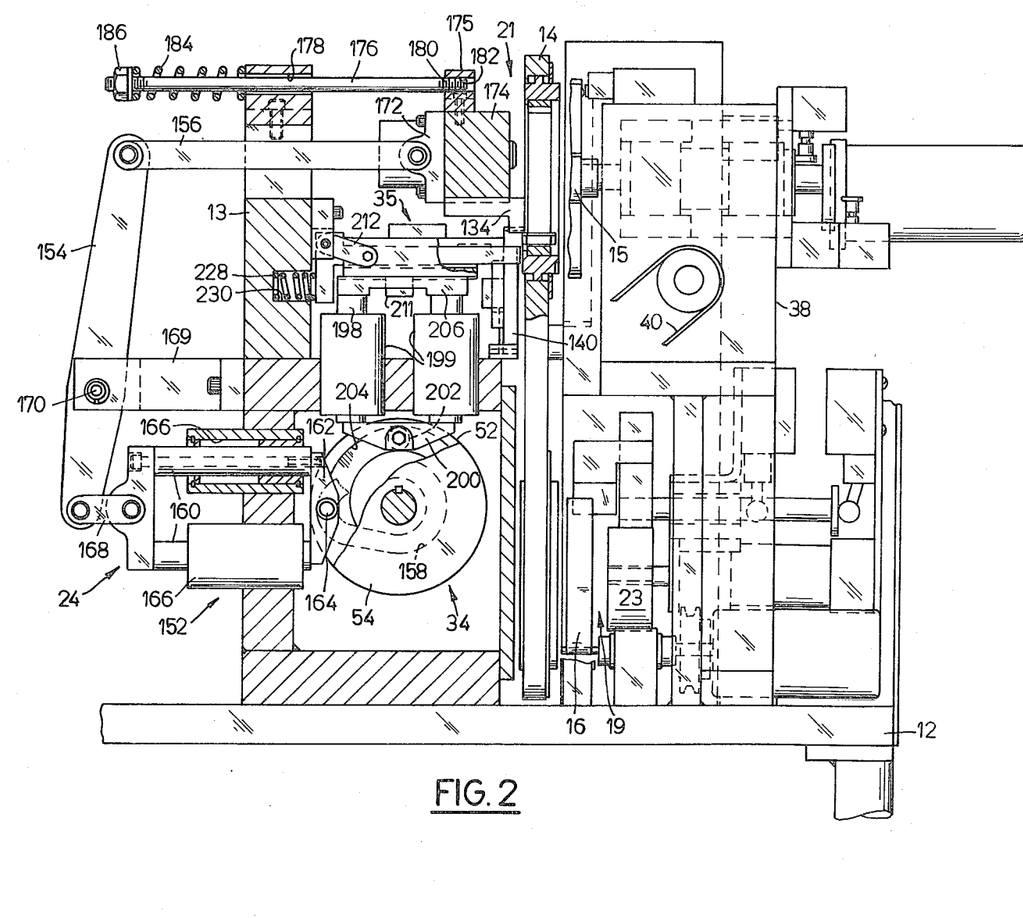
FIG. 2 is a side view partially in section of the cell inserting machine showing the cell inserting apparatus.
Figure 3:
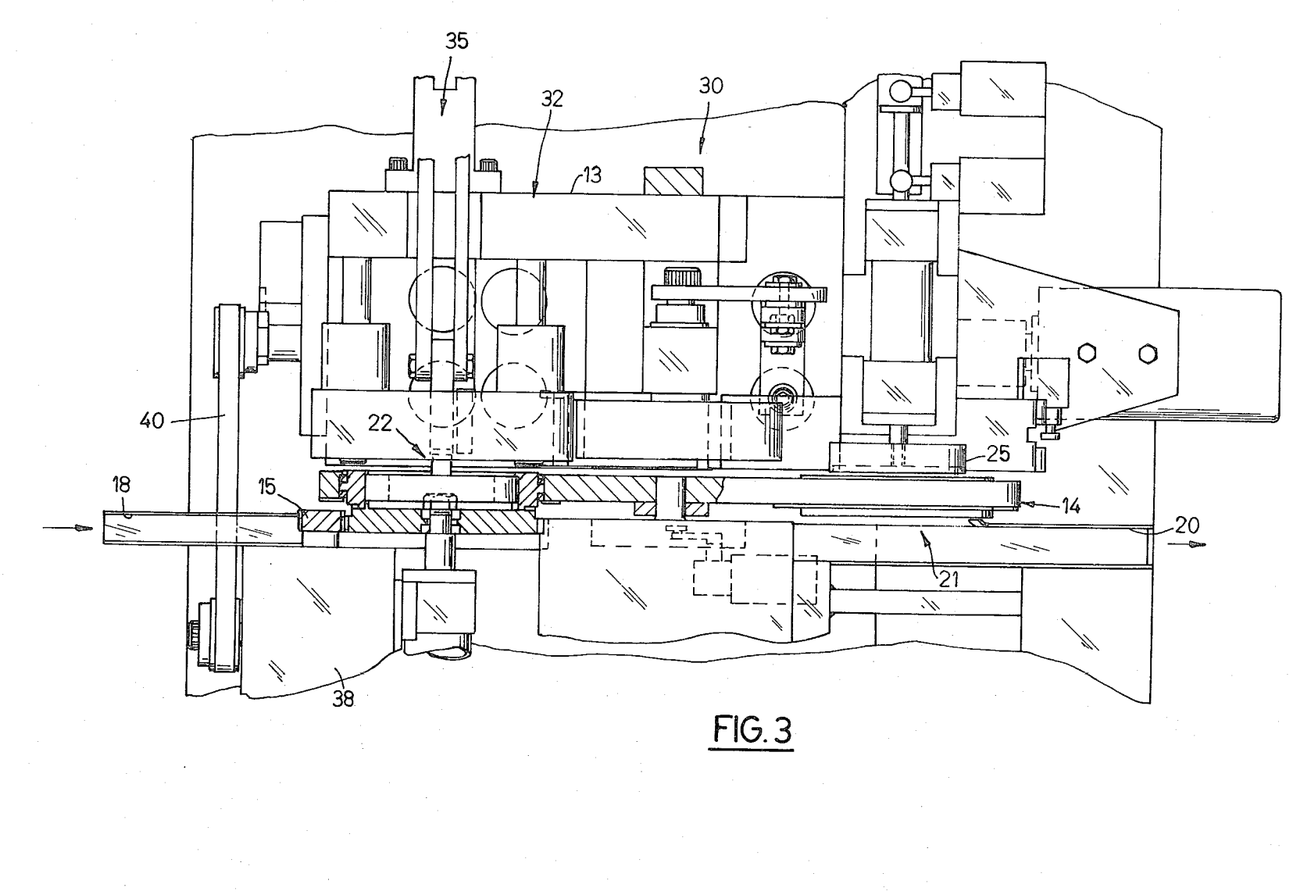
FIG. 3 is a top view of the cell inserting machine.
Figure 10:
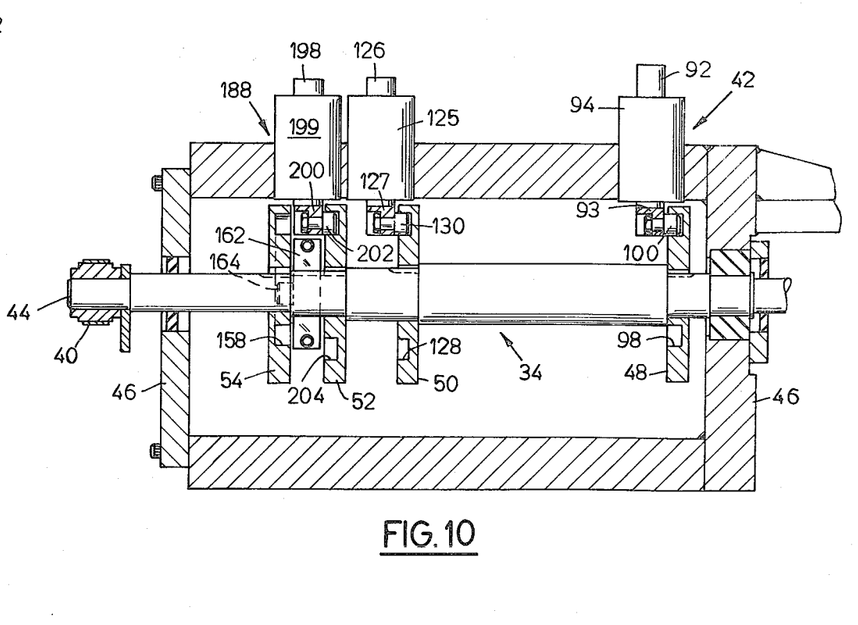
FIG. 10 is a side view in section of the cam gear case.

CAM DRIVE ASSEMBLY (FIGS. 2 AND 10)

All of the operating assemblies, i.e., material feed assembly 30, cutting assembly 32 and the cell inserting assembly 35 are driven off of a common cam drive assembly 34. In this regard, the cam drive assembly 34 is driven by a motor 37 through an index unit 38 which is connected to the cam drive assembly 34 by means of a drive belt 40.

The cam drive assembly 34 includes a cam case 42 having a cam shaft 44 journalled for rotation in the end walls 46 of the case 42. A number of cams 48, 50, 52, and 54 are mounted on the cam shaft 44. Cam 48 is used to drive the material feed assembly 30, cam 50 is used to drive the cutting assembly 32 and cams 52 and 54 are used to drive the cell inserting assembly 35.

Each of the drive arrangements for these assemblies 30, 32 and 35 are described in connection with the corresponding assembly.

THE MATERIAL FEED ASSEMBLY (FIGS. 5–9)

The material feed assembly 30 generally includes a cuff-former 56 and a material drive mechanism 58. The strip 28 of material is fed through the cuff-former 56 and through the material drive mechanism 58 for delivery to the cutting assembly 32.

In this regard, the cuff former 56 (FIGS. 7, 8 and 9) includes a bottom or supporting plate 60 and a top plate 62. The bottom plate 60 includes a groove 64 and a pair of slots 66 at the end of the groove 64. A pair of cuff insert recesses 68 are located at the end of the slots 66.

Figure 7:
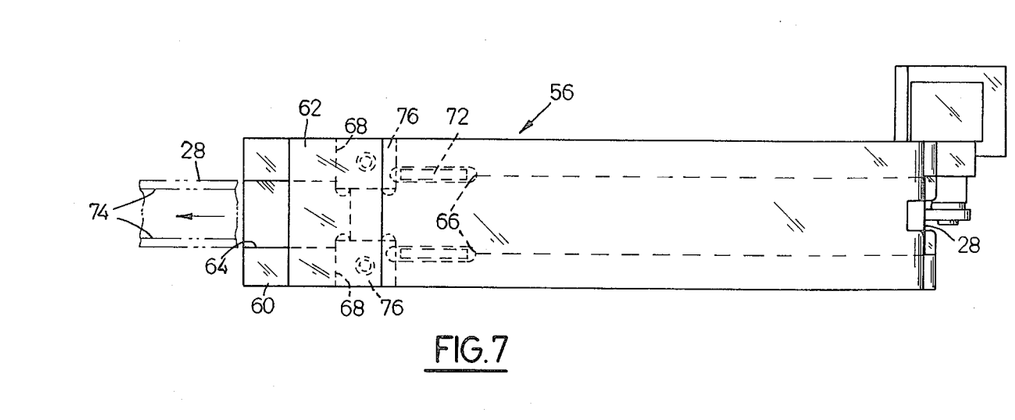
FIG. 7 is a top view of the cuff former.
Figure 8:
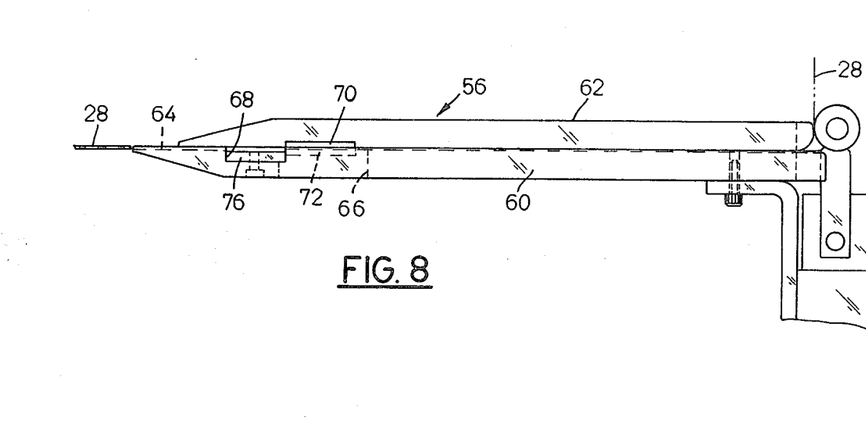
FIG. 8 is a side view of the cuff former.
Figure 9:
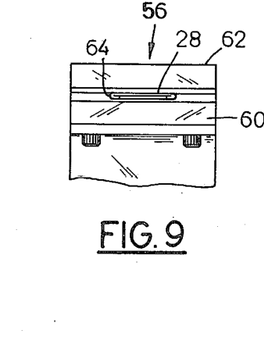
FIG. 9 is an end view of the cuff former.

The upper or top plate 62 is mounted on the bottom plate 60 in a position to confine the strip of material 28 in the groove 64. A cuff guide 70 is mounted on the top plate 62 and includes a pair of ribs 72 which project into the slots 66 in the bottom plate 60. The ribs 72 are located in the path of motion of the edges 74 of the strip 28 and act to fold the edges down into the slots 66. The edges 74 are folded under the strip 28 by means of cuff insert blocks 76 located in the recesses 68 at the end of the slots 66. The strip 28 of material as it immerges from the end of the cuff former assembly 56 will have both edges 74 folded under the strip 28.

Figure 5:
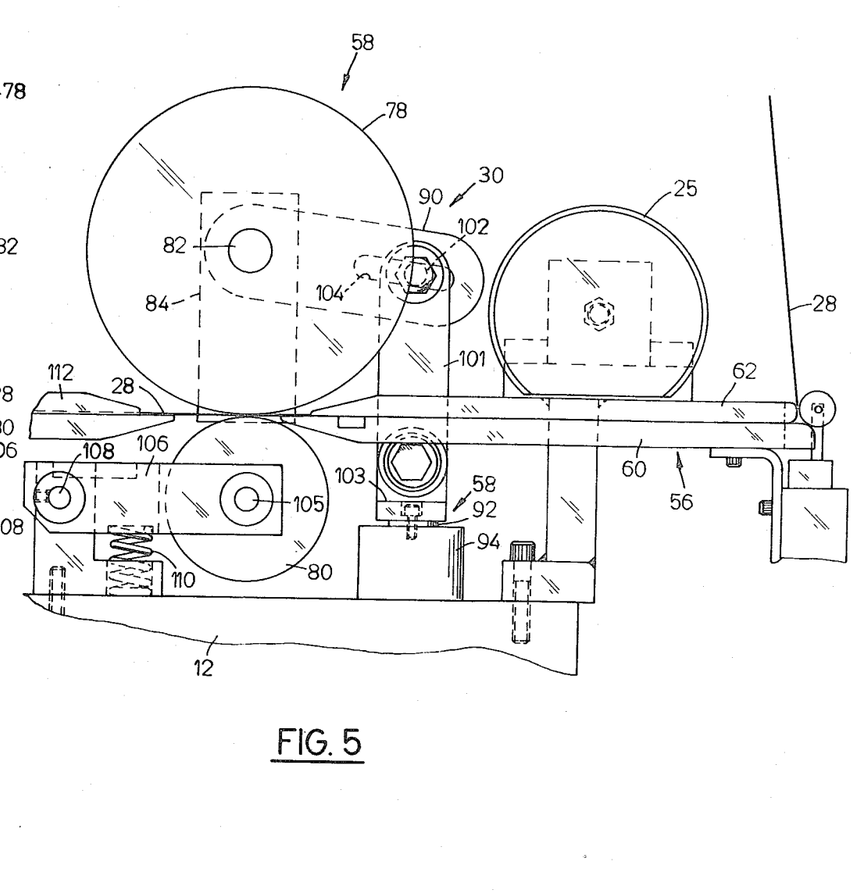
FIG. 5 is a side view in elevation of a portion of the machine showing the cuff former and material drive assembly.
Figure 6:
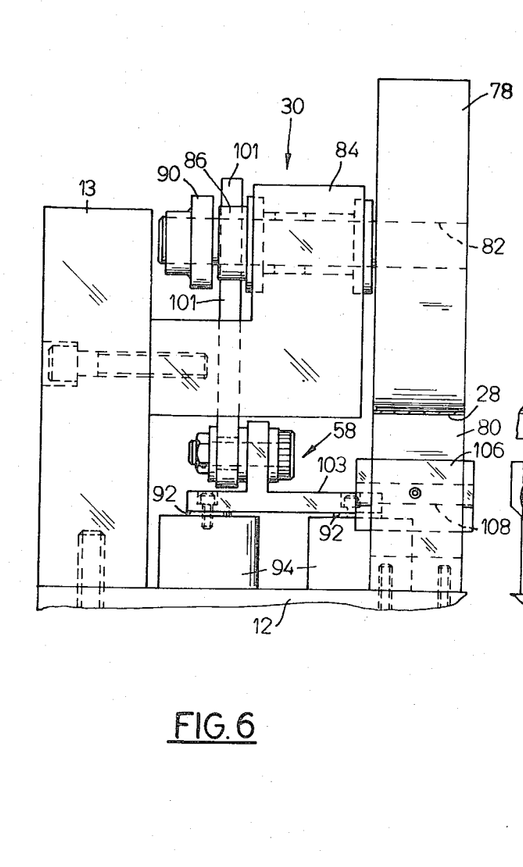
FIG. 6 is an end view of the drive mechanism of FIG. 5.

The strip 28 of material is fed in a step-by-step manner through the cuff forming assembly 56 to the cell inserting station 22 by means of the drive mechanism 58. The drive mechanism 58 includes a feed roller 78 and an idler roller 80. The feed roller 78 is mounted on a shaft 82 which is journalled in a feed roller support 84 mounted on the base 12. A one-way clutch 86 is provided on the end of the shaft 82. The clutch 86 is driven by means of a drive link 90 connected to a connecting link 101 which is connected to a plate 103 on drive rods 92. The drive rods 92 are reciprocated by means of the cam 48 provided in the cam case 42. In this regard, the cam 48 includes a cam groove 98. The drive rods 92 are mounted for vertical motion in bearing housings 94 provided in case 42 and are connected at their inner end to a cam follower plate 93. A cam follower 100 is provided on the block 93 and is positioned in the cam groove 98. The reciprocal motion of the drive rods 92 is transferred to the drive link 90 by the link 101 through a pin 102 positioned in a slot 104 in the drive link 90.

The idler roller 80 is mounted for rotation on a pin 105 at the end of pivot arm 106 which is pivotally mounted on a pin 108. The idler roller 80 is biased into engagement with the feed roller 78 by means of a spring 110. On rotation of the cam 48, the cam follower 100 will follow the contour of the groove 98 moving the drive rods 92 through a complete reciprocal movement once in each revolution of the cam 48 to advance a predetermined length of material to the cutting assembly 32.

Figure 11:
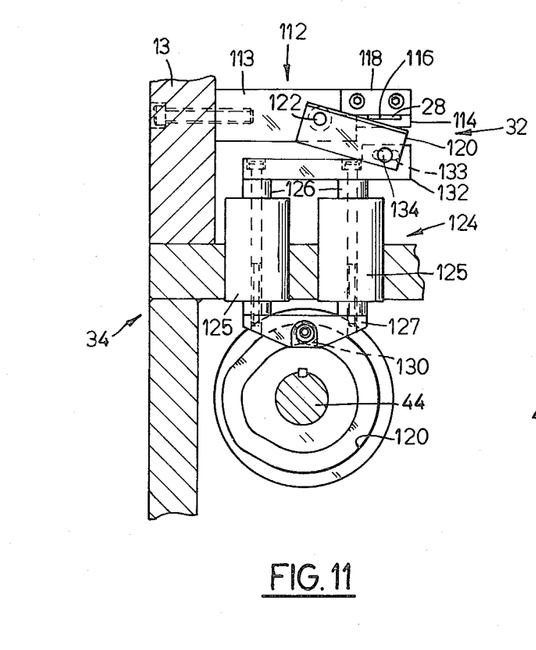
FIG. 11 is an end view in elevation of the cutting assembly.
Figure 12:
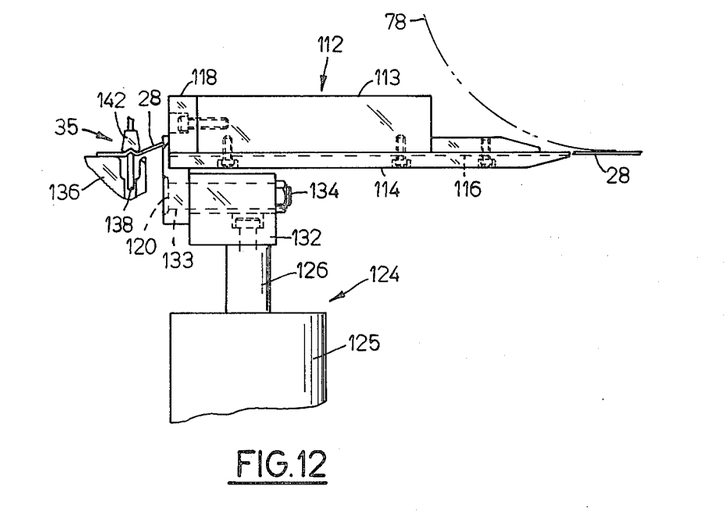
FIG. 12 is an end view of the cutting assembly.
Figure 13:
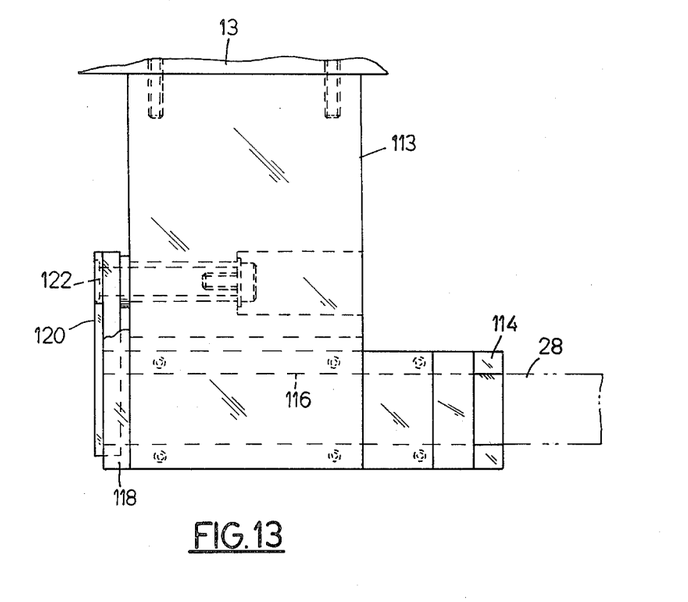
FIG. 13 is a top view of the cutting assembly.

CUTTING ASSEMBLY (FIGS. 11, 12 AND 13)

The cutting assembly 32 is located at the end of a material guide 112 in a position to cut the strip of material 28 into predetermined lengths after it has been fed to the cell inserting assembly 35. The material guide 112 includes a support block 113 mounted on a plate 13, a cut-off support plate 114 and a cut-off block 118. A material guide groove 116 is provided in the support plate 114. The cutting assembly 32 includes a knife 120 which is mounted for pivotal movement on a pivot pin 122 provided on the support block 113. The knife 120 is pivoted to cut off a predetermined length of the strip 28 of material by means of a knife drive assembly 124.

In this regard, the knife drive assembly 124 includes a pair of drive rods 126 journalled for reciprocal movement in bearing housings 125 in the cam case 42. A cam follower plate 127 is connected to the inner end of drive rods 126 which is connected to a groove 128 in the cam 50 by means of a cam roller 130. A cut-off block 132 is mounted on the upper end of the drive rods 126 and includes a slot 133. A guide pin 134 is positioned in the slot 133 and is secured to the end of the knife 120. The drive rods 126 are moved through a complete reciprocal motion once in each revolution of the cam 50 to cut-off the end of the strip of material 28.

THE CELL FORMING ASSEMBLY (FIGS. 14–19)

The cell forming assembly 35 includes an insert bar 134, a cell former 136, a cell creaser blade 138 and a plow 140. The strip of material 28 after being fed to cell inserting station 22 is creased by means of the creaser blades 138 and cut to the predetermined length by the cutting assembly 32 to form the body portion 25 of the cell 26. The body portion 25 is then formed around the insert bar 134 by means of the cell former 136 and indented at 29 intermediate its ends to form a W-shaped cell 26. After forming the cells 26 on the insert bar 134, the insert bar 134 is moved into the slots 17 of the stator through the plow 140 as described hereinafter.

INSERT BAR

Figures 14, 15:
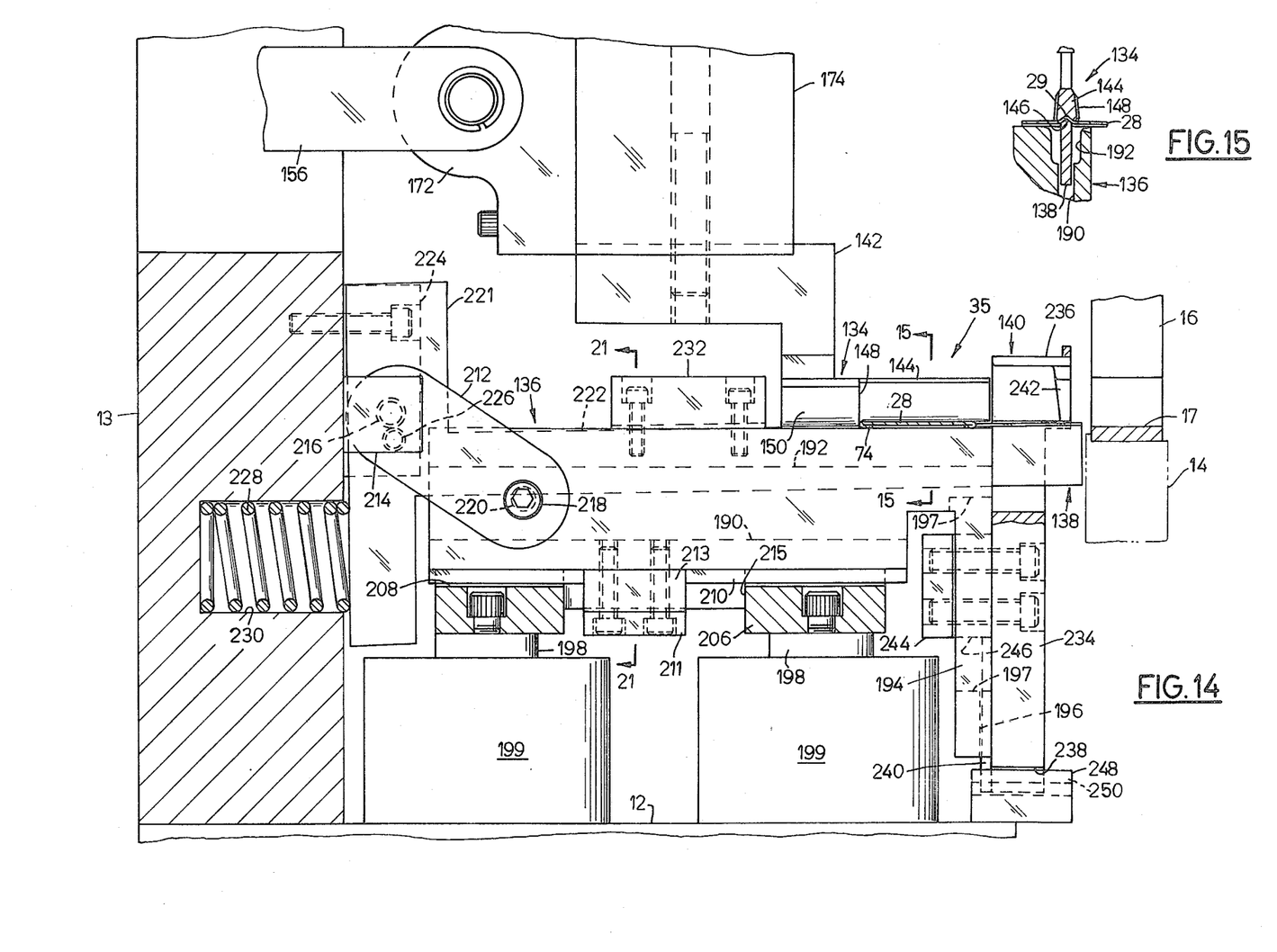
FIG. 14 is a side view of the cell forming and inserting assembly shown in a start position.
FIG. 15 is a view taken on line 15—15 of FIG. 14 showing the creaser blade seated on the cell carrier.
Figures 16, 17:
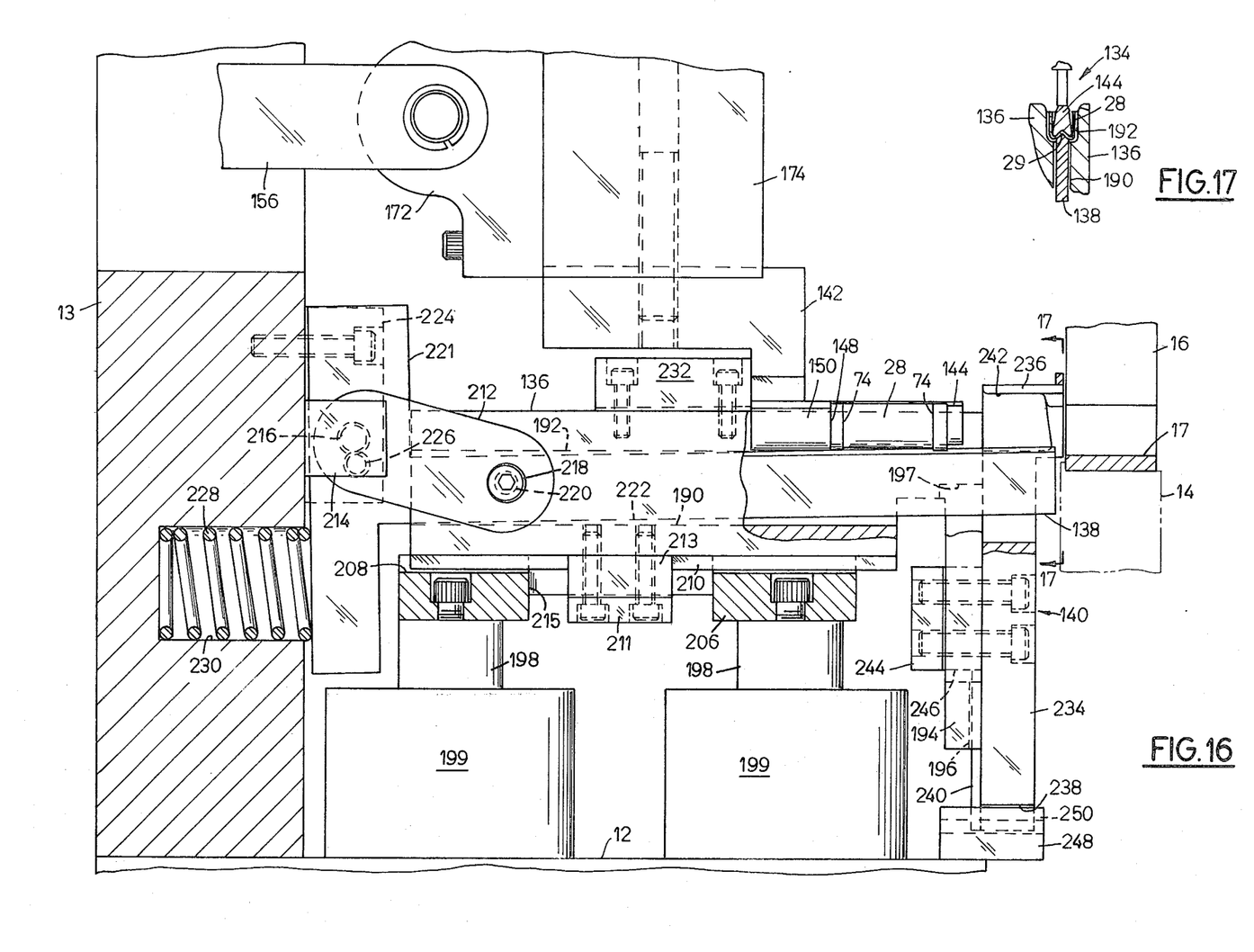
FIG. 16 is a view similar to FIG. 14 showing the former moved in the cell forming position.
FIG. 17 is a view taken on line 17—17 of FIG. 14 showing the cell formed on the cell carrier.

More particularly, the insert bar 134 includes a support member 142 and a cell carrier 144. The cell carrier 144 is shaped to generally conform to the shape of a stator slot 17 as seen in FIGS. 13, 15 and 17 and includes a V-shaped groove 146 in the bottom. The cells 26 formed on the carrier 144 are pushed through the plow 140 by means of a shoulder 148 provided on an enlarged section 150 at the end of the carrier 144.

The insert bar 134 is moved into the slot 17 of the stator 16 by means of a drive assembly 152 (FIGS. 2 and 8) connected to a rocker arm 154 which is connected to the insert bar 134 by a link 156. In this regard, the drive assembly 152 includes a cam groove 158. The cam 54 is connected to the rocker arm 154 by means of a pair of drive rods 160 mounted on a cam follower member 162 which includes a cam follower 164 positioned in the groove 158. The drive rods 160 are mounted for linear motion in bearing housings 166 in the cam case 52 and are connected to the rocker arm 154 by means of a link 168.

The rocker arm 154 is pivotally mounted on a rocker pivot block 169 by means of a pin 170. The rocker arm 154 is connected at its upper end to the insert bar 134 by means of a link 156 which is connected to a pivot block 172 mounted on an insert block 174 which is secured to the insert bar 134. The insert block 174 is supported for linear movement toward and away from the stator 16 by means of a rod 176 which is mounted for axial movement through a guide bore 178 in the vertical support 13. The rod 176 is secured to the block 174 by means of a threaded section 180 which is threadedly received in a threaded bore 182 in a block 174 mounted on the insert block 174. The rod 176 is biased to a loading position by means of a spring 184 positioned between the base 12 and a nut 186 provided on the end of the rod 176.

THE CELL FORMER

The cell former 136 includes a groove 190 having an enlarged section 192 at the upper end which conforms generally to the shape of the carrier 144. A depending flange 194 is provided on the forward end of the former 138 and includes a guide groove 196 at the lower end and a guide slot 197.

The cell former 136 is moved vertically with respect to the insert bar 134 by means of a cam drive assembly 188 connected to the cam 52 on the drive shaft 44. The cam 52 is connected to a pair of drive rods 198 mounted on a cam follower block 200 having a cam follower 202 positioned in a cam groove 204 in the cam 52. The drive rods 198 are mounted in drive rod guides 199 connected at their upper ends to a cell former block 206 having a groove 208 in its upper surface. The cell former 136 includes a flange 210 on the bottom which is positioned for horizontal movement in the groove 208. The cell former 136 is retained on the cell former block 206 by means of a retainer 211 having a narrow body portion 213 positioned in a slot 215 in block 206.

The cell former 136 is moved horizontally during the vertical motion of the drive rods by means of a plow rocker link 212. In this regard, the rocker link 212 is pivotally connected to a pivot block 214 by means of a pin 216 and to the cell former 136 by means of a pin 218 positioned in an opening 220 in the cell former 136. On vertical upward movement of the drive pins 198, the rocker link 212 will pivot about pin 216 pushing the cell former outwardly in groove 208 in the cell former block 206.

CELL CREASER BLADE

The cut strips of material are initially held against the cell carrier 144 and simultaneously creased or indented by means of the cell creaser blade 138. The cell creaser blade 138 includes a base portion 221 and a blade portion 222 which is positioned in the groove 190 of the cell former 136. The blade 138 is pivotally mounted on a pivot block 224 by a pin 226 and is biased in a counterclockwise direction by means of a spring 228 positioned in a recess 230 in the base 12. The blade portion 222 is long enough to extend through the length of the former 136 and the plow 140. The blade 138 is pivoted to an inoperative position by means of a block 232 mounted on the former 136 across the top of the groove 192 in a position to engage the blade portion 222.

After a strip of material has been fed to the cell inserting station, it will be located on the bottom of the cell carrier 144 (FIG. 13). The cell former 136 is moved upward a short distance allowing the creaser blade 138 to move upward into the groove 146 in the cell carrier 144 due to the bias of spring 228. The movement of the blade portion 222 into the groove 146 will indent the strip of material at 29 and hold the material in a fixed position against the bottom of the cell carrier 144.

The cutting assembly 32 then moves to cut off the end of the strip 28 of material. The cell former 136 then moves to the cell forming position wrapping the material around the outside surface of the cell carrier 144 (FIG. 15). The former 136 will remain in the upper position during the movement of the cell carrier 144 through the plow 140 into the slot 17 of the stator 16.

Figures 18, 19:
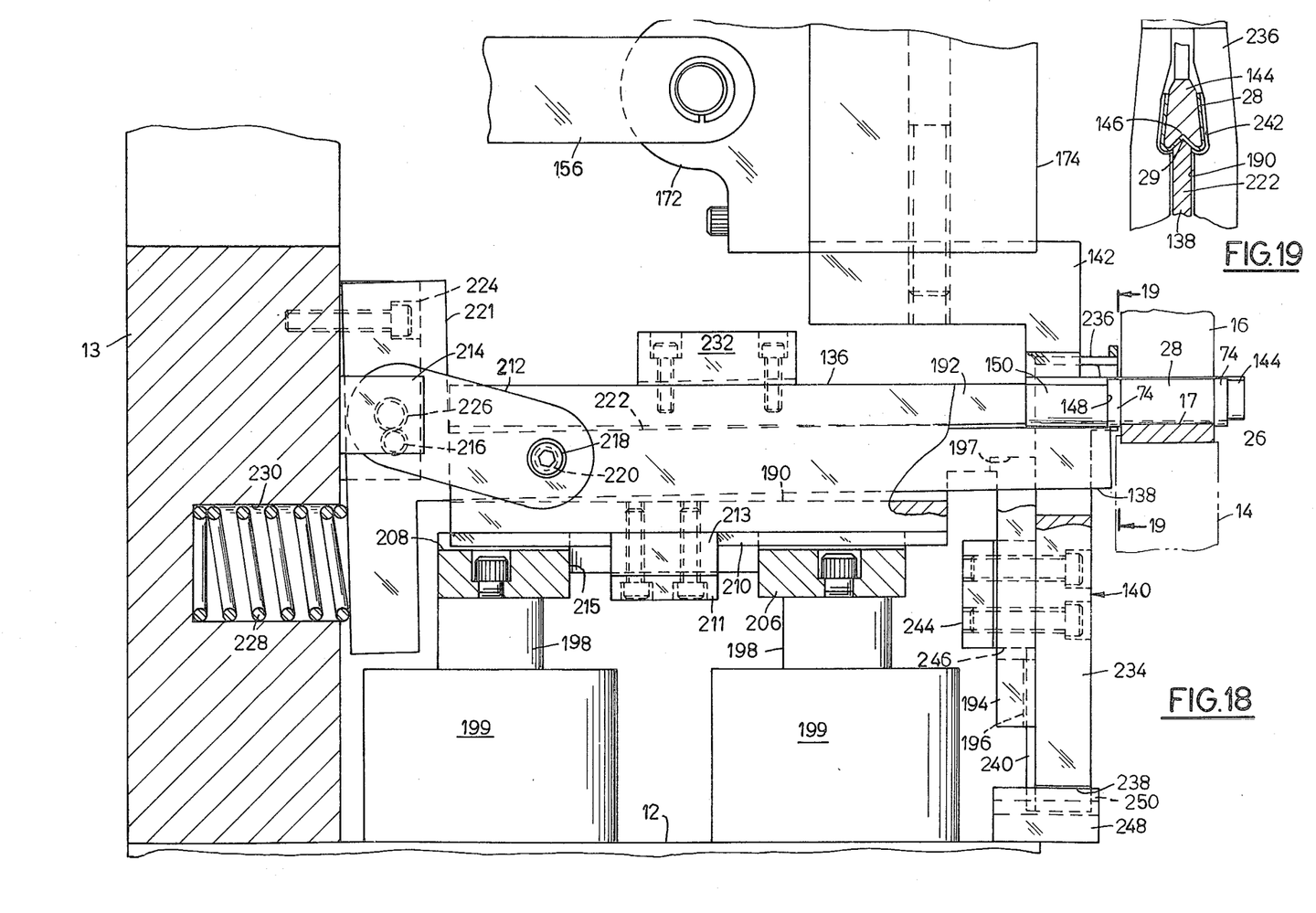
FIG. 18 is a view similar to FIG. 14 showing the cell carrier in the stator slot.
FIG. 19 is a view taken on line 19—19 of FIG. 16 showing the cell as it emerges from the plow.
Figures 20, 21, 22:
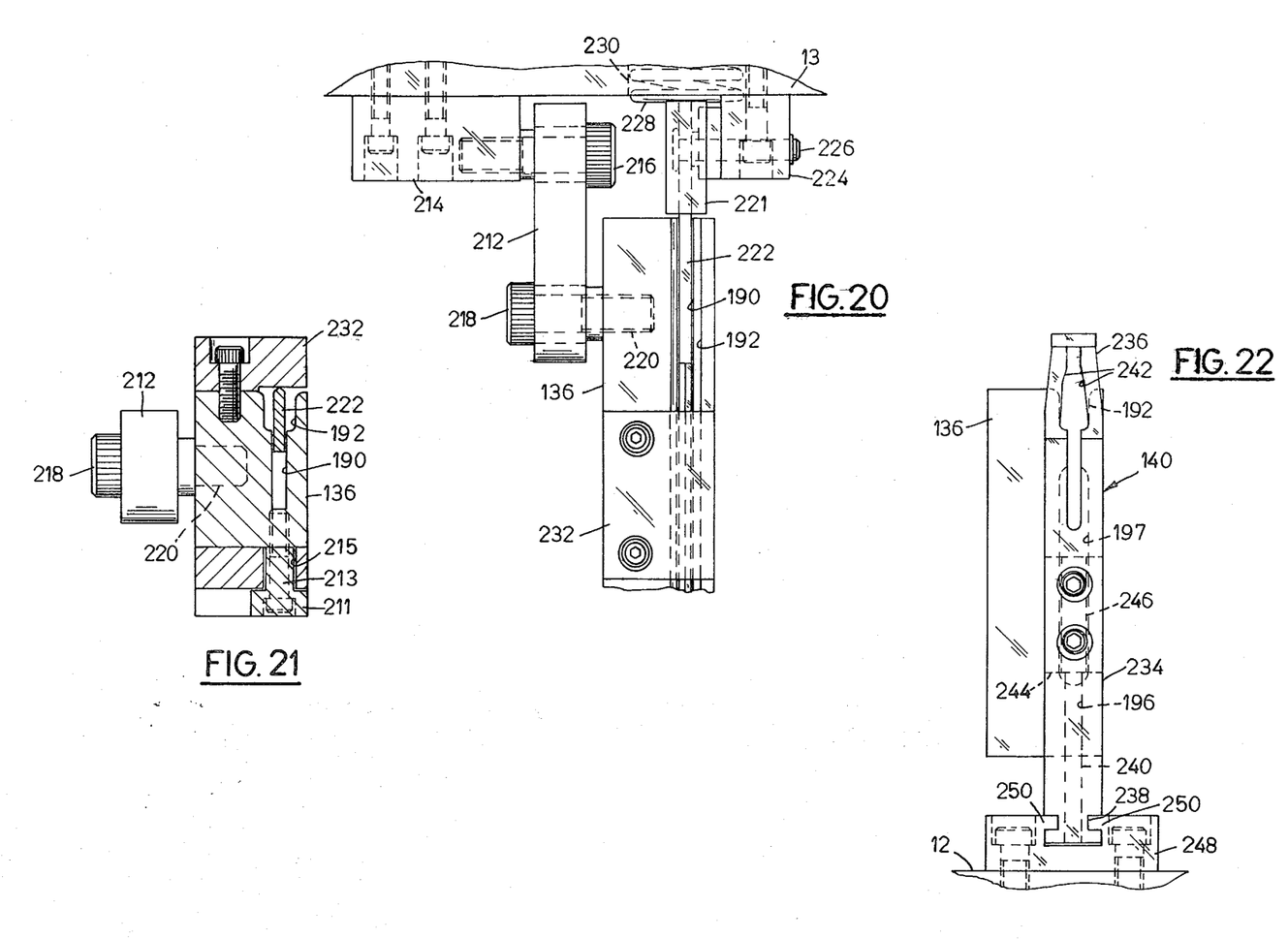
FIG. 20 is a top view of a portion of the cell former.
FIG. 21 is a view taken on line 21—21 of FIG. 14 showing the cell former and creaser blade arrangement.
FIG. 22 is a front view of the plow shown mounted on the cell former.

PLOW (FIGS. 18 AND 22)

The cells 26 are shaped to conform to the shape of the slots 17 by means of the plow 140. In this regard, the plow 140 includes a body portion 234 having a head block 236 at one end, a pair of guide grooves 238 at the other end and a guide flange 240 in the back. A tapered slot 242 is provided in the head 236 which tapers inwardly from the back to the front to press the cell material 28 against the sides of the carrier 144. The plow 140 is mounted for horizontal movement on the base 12 by means of a guide block 248. The guide block 248 includes a pair of inwardly facing flanges 250 which are aligned in the grooves 238 at the lower end of the plow 140. The plow 140 is then free to move horizontally but cannot move vertically.

The plow 140 is connected to move horizontally with the cell former 136 but cannot move vertically. In this regard, the flange 240 in back of the plow 140 is aligned in the groove 196 on the front of the cell former 136. The plow is retained on the former 136 but prevented from moving vertically by means of a plow retainer 244 having a body portion 246 positioned in the slot 197 in the former 136. The horizontal movement of the former 136 will seat the plow 140 against the face of the stator 16. When the former 136 is returned to its initial position by the downward movement of the rods 198, the retainer 244 will slide in the slot 197 and pull the plow rearwardly with the former 136.

The cell 26 will remain in the slot 17 of the stator 16. The inherent resiliency of the material will cause the indent 29 to flatten out moving the body portion outwardly to a snug fit in the slot 17.

OPERATION

In operation, the strip 28 of cell material is fed by means of the drive mechanism 58 through the cuff former 56 into the cutting assembly 32. The edges 74 of the strip of material 28 are continuously turned over in the cuff former 56 producing the cuff 74 on each edge of the strip 28 of cell material.

Figure 4:
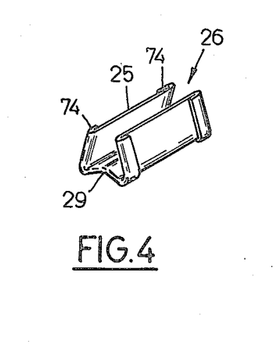
FIG. 4 is a perspective view of a cell of the type formed by the cell inserting machine.

The material is fed in a step-by-step manner in a sequence determined by the cams in the cam case 42. The sequence is timed to correspond to the indexing of the stators 16 in the turret as each cell 26 is carried into the slot 17 of the stator 16. In this regard, after a predetermined length of the strip 28 of cell material has been fed to the cutting assembly 32, the cell former 136 is moved upward a distance sufficient to allow the blade portion 222 of the creaser blade 138 to move into the groove 146 on the cell carrier 144. The creaser blade 138 will produce an indentation 29 in the strip of material 28 as seen in FIGS. 4 and 15. The strip of material 28 is held in this position while the cutting assembly 32 is actuated to cut off a predetermined length of material from the end of the strip of material 28.

Upon completion of the cutting step, the cell former 136 is moved upward to wrap the strip of material around the outer surface of the cell carrier 144. This is accomplished by moving the former upward a distance sufficient for the cell carrier 144 to be fully seated in the groove 192. Simultaneously with the upward movement of the cell former 136, the link 212 will move the cell former horizontally toward the stator 16. The horizontal movement of the cell former 136 to the position shown in FIG. 16 will also move the plow 140 into abutting engagement with the stator 16. The slot 242 in the plow 140 will then be aligned with a slot 17 in the stator 16.

The cell 26 is then moved into the slot 17 by the pivotal movement of the rocker arm 154 about the pin 170. The cell carrier 144 will move through the slot 242 in the plow a distance sufficient for the cuffs 74 on the cell 26 to be located on the outside surfaces of the stator 16. The cuffs will expand slightly to engage the outer surface of the stator 16 and on withdrawal of the cell carrier 144 from the stator the cell will be retained in the slot 17. On removal of the cell carrier from the slot 17, the inherent resiliency of the strip of material will cause the indent 29 formed by the creaser blade 138 to straighten out at the bottom of the cell 26. The amount of movement provided by the indent will be sufficient to seat the cell 26 snugly in the slot 17 of the stator. Simultaneously with the withdrawal of the cell carrier 144 from the stator 16, the cell former 136 will return to its initial position and the block 232 on the cell former 136 will engage and pivot the creaser blade 138 downward against the bias of the spring 228 away from the cell carrier 144.

Upon return of the cell carrier 144 and cell former 136 to their initial positions, the stator 16 will be indexed to bring the next slot 17 into alignment with the plow 140. The feed mechanism will be actuated to feed a predetermined length of the strip of material 28 into the space between the cell former 136 and the cell carrier 144. The operation is then automatically repeated until all of the slots 17 in the stator 16 have been filled. The turret 14 is then indexed to move the filled stator to the unloading station.

I claim:

1. In a cell inserting machine for automatically inserting cells into the slots of a stator, the machine including:

a turret vertically mounted for rotary motion on a base, the turret being indexed to move a stator from a loading station to a cell inserting station to an unloading station, the improvement comprising:

means for feeding a strip of cell material into said inserting station, means for holding the end of the strip at the inserting station, means for cutting the end of the strip to a predetermined length, means for forming the cut strip to the shape of a stator slot, a plow for guiding the cell into the slot of said stator, and means for carrying the cell through said plow into a slot in the stator.

2. The machine according to claim 1 wherein said plow includes a slot tapered to a shape substantially similar to the slot in the stator.

3. The machine according to claim 3 including means for moving said plow into abutting engagement with said stator to align the slot in the plow with the slot in the stator.

4. The machine according to claim 1 including means for forming cuffs around the edges of said strip of cell material.

5. The machine according to claim 1 wherein said carrying means includes a cell carrier mounted for movement into the slots of said stator and having an outer shape generally conforming to the shape of the slot in the stator and said forming means includes a forming block having a slot shaped to wrap said cut length of material around said carrier and means for moving said forming block to wrap said strip around said carrier.

6. The machine according to claim 5 wherein said holding means includes a creaser blade positioned in the slot in the forming block and biased to engage said carrier.

7. The machine according to claim 6 wherein said carrier includes a groove along one edge and said blade is positioned to move into engagement with said groove to form an indent in the strip of material.

8. The machine according to claim 6 wherein said guiding means is mounted for horizontal movement with said forming block.

9. The machine according to claim 1 wherein said forming means includes means for forming an indent in the end of the cell material.

10. A cell inserting apparatus for cutting, forming and inserting cells into the slots of a stator, said assembly including an insertion bar having a cell carrier, a cell former having a slot to receive said carrier, a cell creaser blade positioned in said slot in said former, means for moving said blade to a position to hold said strip of cell material against said insertion bar prior to cutting, said blade simultaneously creasing said cell material during the initial movement of said cell former, means for cutting said strip of material into predetermined lengths, means for moving said former to a position to wrap said cut strip around said carrier, a plow positioned in the path of motion of said cell carrier, said plow having a tapered slot shaped to confrom the cell to the shape of the slot in said stator, and means for moving said insertion bar toward the slot of the stator whereby the cell formed on the cell carrier is carried through the plow into the slot of the stator.

11. The apparatus according to claim 10 wherein said plow is secured and operatively connected to move longitudinally with said cell former and means for moving said former longitudinally during the forming motion of said former to seat said plow against said stator.

* * * * *

Disclaimer 3,909,902.—*Robert W. Peters*, Milwaukee, Wis. CELL INSERTING MA-
CHINE. Patent dated Oct. 7, 1975. Disclaimer filed Jan. 19, 1977, by
the inventor.

Hereby enters this disclaimer to claims 1 through 11 of said patent.

[*Official Gazette March 8, 1977.*]